350-319

SEARCH ROOM

April 16, 1968 S. ZAROMB 3,378,327

ELECTRICALLY CONDUCTIVE OPTICAL ELEMENT

Filed March 30, 1966

INVENTOR.
SOLOMON ZAROMB

BY Roberts & Cohen

ATTORNEY 3,378,327
Patented Apr. 16, 1968

3,378,327

ELECTRICALLY CONDUCTIVE OPTICAL ELEMENT

Solomon Zaromb, 376 Monroe St., Passaic, N.J. 07055
Continuation-in-part of application Ser. No. 305,161, Aug. 28, 1963. This application Mar. 30, 1966, Ser. No. 538,793
4 Claims. (Cl. 350—319)

ABSTRACT OF THE DISCLOSURE

An optical element comprises a transparent electrically conductive coating on a light permeable substrate, said coating being broken up by one or more non-conductive longitudinal openings which are rendered inconspicuous by obturation with a transparent material of low electrical conductivity directly contacting said substrate and having substantially the same refractive index as the conductive coating. The obturating and the conductive coating materials may be two differently doped forms of tin oxide. The obturating low conductivity material may be either in the form of a continuous layer beneath the conductive coating or may merely fill the openings in the conductive coating.

Figures 1, 1A, 2, 2A, 2B, 2C, 2D:
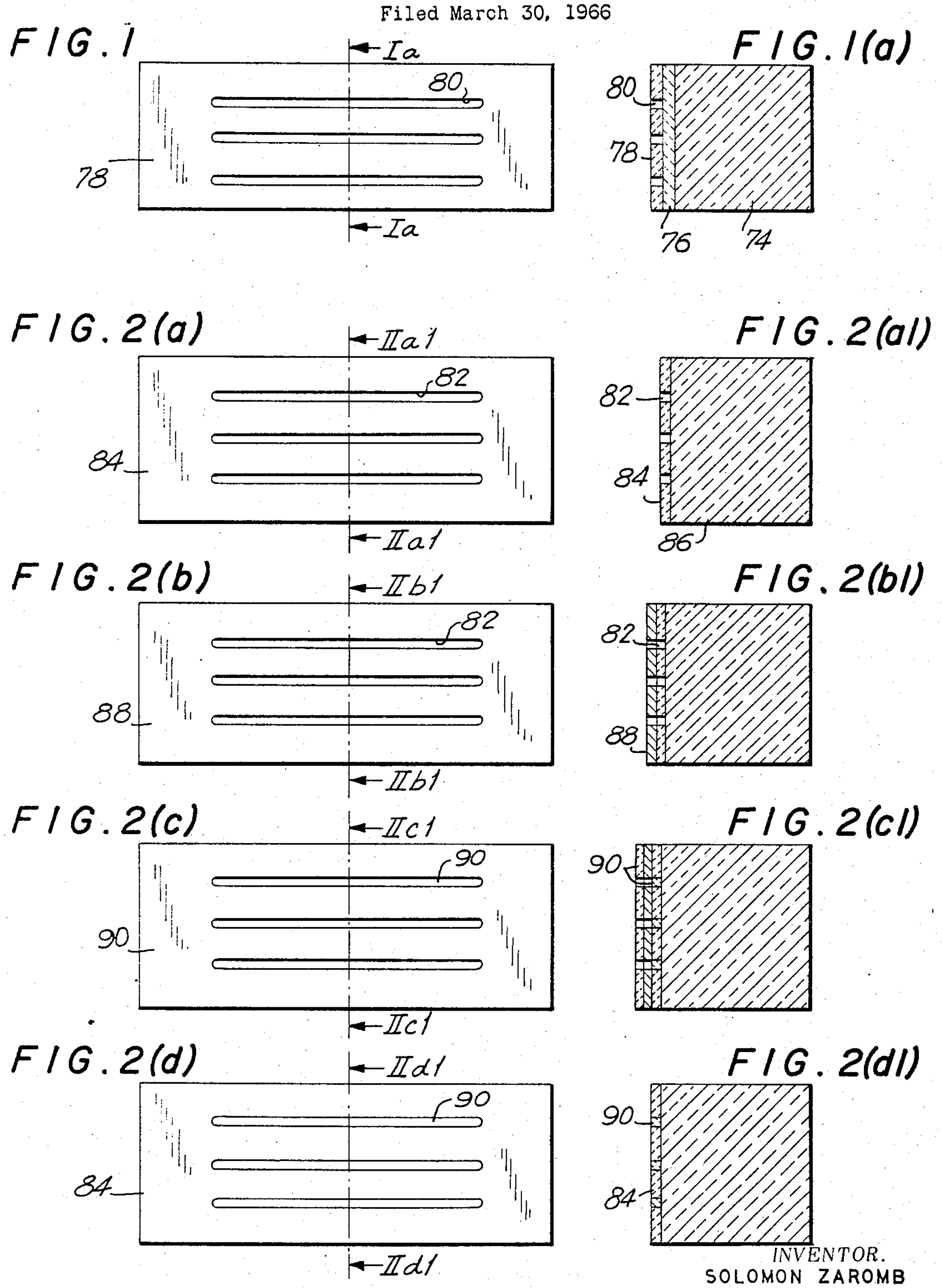

This invention relates to methods and apparatus for generating non-conductive line patterns in electrically conductive surfaces or coatings. This application is a continuation-in-part of my previously filed application Ser. No. 305,161 of Aug. 28, 1963, issued as Patent Number 3,305,666.

In another previously filed and copending application Ser. No. 257,988 filed Feb. 12, 1963, issued as Patent Number 3,291,551, I have disclosed a novel optical shutter in which strips of light-permeable conductive material are positioned on a light-permeable base and the strips are positioned in an electrolyte so that an electrolytic deposition can be effected to render the aforesaid strips selectively opaque thereby constituting an optical shutter.

I now propose to make precise fine line patterns through a conductive coating deposited on a light-permeable base with techniques which are adapted to mass production and to make such patterns invisible.

In accordance with the invention I propose to remove precise patterns from coatings applied to a light-permeable base, in combination therewith, to employ techniques which render the patterns invisible.

It is an object of the invention to provide improved methods for treating conductive coatings in such a manner as to establish very precise non-conductive patterns therein.

Another object of the invention is to provide optically uniform shutters free of diffuse optical distortions which might arise due to differences in transmission between conductive and non-conductve areas.

The methods of the invention as well as objects, features and advantages of the invention will be better understood from the following detailed description of some of its preferred embodiments as illustrated in the accompanying drawing in which:

FIGURE 1 diagrammatically illustrates a technique for effectively concealing openings in the conductive coating;

FIGURE 1(*a*) is a cross-section taken along line I*a*—I*a* of FIG. 1; and

FIGURES 2(*a*)–2(*d*) and the corresponding cross-sectional views of FIGS. 2(*a*1)–2(*d*1) shows a further technique for concealing such openings.

With respect to the environmental background of the invention, I have previously proposed using a tin oxide coating on the surface of a light-permeable base such as glass, quartz and the like in association with an electrolyte and in such a manner that an electrical potential is applied to the coating to cause an electrolytic deposition thereon whereby the coating which is normally light-permeable is caused to become opaque. This process is reversible and I have found that apparatus of this type functions very well as an optical shutter device.

The openings which have been noted above constitute non-conductive lines useful in shutters and other electrical components of the above noted type. An object of this invention is to provide optically uniform shutters free of optical distortions which might arise due to differences in light transmission between the conductive and non-conductive areas.

Generally, in accordance with the invention, the non-conductive areas may be covered with a non-conductive material of the same or approximately the same refractive index as that of the conductive material. In particular, tin oxide may be provided in both conductive and non-conductive forms depending on the doping or additives employed. Small concentrations of antimony make the tin oxide more conductive whereas the addition of indium reduces the conductivity of a tin oxide film. Accordingly, it is proposed, in accordance with the invention, to obturate the windows or openings in the conductive coating of tin oxide with non-conductive tin oxide. The two forms of tin oxides have approximately the same refractive index. Because tin oxide is essentially transparent, it is only because of the differences of refractive index as between tin oxide and the transparent supporting body of glass, quartz or the like which renders the openings or windows visible. The refractive index of tin oxide is approximately 2.0 and that of, for example, a glass supporting body may be approximately 1.5. By covering or obturating the openings with the non-conductive tin oxide the openings are at least substantially completely masked.

While non-conductive or poorly conductive tin oxide must constitute the preferred masking material because of its close similarity to the conductive tin-oxide coating, other substances whose refractive index is closer to that of tin-oxide than to that of glass could obviously serve the same purpose, although not as well as the non-conductive tin oxide coating.

Two processes accomplishing the above are illustrated in the drawing. More particularly, in FIGS. 1 and 1(*a*) appears a transparent supporting body 74 and on this body is deposited a complete coating of non-conductive transparent material 76 constituted, for example, by the aforesaid non-conductive tin oxide. Thereafter, a coating of conductive oxide film 78 is deposited on material 76 and finally, openings 80 are formed in the uppermost layer only by the use of one of the techniques described hereinbefore. The openings 80 thus do not connect directly with body 74 and, as a result, the refractive indexes are matched.

Alternative to the above, openings 82 (FIGS. 2(*a*) and 2(*a*1) may be made in conductive coating 84, thereby exposing transparent supporting body 86. As then appears in FIGS. 2(*b*) and 2(*b*1), the conductive coating can be plated with a platinum mask 88 or the like whereby openings 82 will still remain. As appears in FIGS. 2(*c*) and 2(*c*1), openings 82 are next coated with non-conductive tin oxide 90 or other suitable material and the depositing of this material need not be effected with any finesse inasmuch as appears in FIGS. 2(*d*) and 2(*d*1) the platinum film is removed with aqua regia or by mechanical peeling or the like to expose the conductive oxide coating surrounding the windows which are now obturated with non-conductive material.

There will be obvious to those skilled in the art, many modifications and variations of the methods and optical elements set forth above. These modifications and variations will not depart from the scope of the invention if defined by the following claims.

What is claimed is:

1. A light shutter element comprising a light-permeable substrate, a coating of transparent electrically conductive material on said substrate and broken up by at least one longitudinal opening, and a transparent material of low electrical conductivity obturating a major portion of said opening and directly contacting said substrate so as to render said major portion substantially inconspicuous, the two said materials having substantially the same refractive index.

2. A shutter element as claimed in claim 1 wherein both materials are two forms of tin oxide.

3. A shutter element as claimed in claim 1 wherein the low conductivity material is in the form of a continuous layer beneath said coating.

4. A shutter element as claimed in claim 1 wherein the longitudinal opening is filled with said low conductivity material.

References Cited

UNITED STATES PATENTS

| | | | |
|---|---|---|---|
| 2,676,117 | 4/1954 | Colbert et al. | 219—543 X |
| 2,704,265 | 3/1955 | Lyon | 219—543 X |
| 2,878,357 | 3/1959 | Thomson et al. | 338—292 |
| 2,954,454 | 9/1960 | Gaiser | 219—522 X |
| 2,557,983 | 6/1951 | Linder | 219—543 |
| 2,564,677 | 8/1951 | Davis | 219—543 X |
| 2,934,736 | 4/1960 | Davis | 338—308 |
| 3,012,924 | 12/1961 | Browne | 338—309 X |
| 3,099,540 | 7/1963 | Eisler | 219—549 X |
| 3,153,113 | 10/1964 | Flanagan et al. | 88—61 |
| 3,177,345 | 4/1965 | Plumat | 219—543 |
| 3,217,281 | 11/1965 | Griest et al. | 338—309 |
| 3,257,903 | 6/1966 | Marks | 88—61 |
| 3,266,005 | 8/1966 | Balde et al. | 338—308 |
| 1,864,592 | 6/1932 | Griffin et al. | 219—50 |
| 2,680,184 | 6/1954 | Cox | 219—383 X |
| 3,119,919 | 1/1964 | Pratt | 219—384 |

RICHARD M. WOOD, *Primary Examiner.*

VOLODYMYR Y. MAYEWSKY, *Examiner.*